(12) United States Patent
Yoko

(10) Patent No.: US 6,378,666 B1
(45) Date of Patent: Apr. 30, 2002

(54) DISC BRAKE

(75) Inventor: Tim Yoko, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/991,617

(22) Filed: Nov. 16, 2001

(51) Int. Cl.⁷ .............................................. F16D 65/02
(52) U.S. Cl. .................. 188/73.38; 188/73.36
(58) Field of Search ................. 188/1.11 R, 72.3, 188/73.31, 73.36–73.38

(56) References Cited

U.S. PATENT DOCUMENTS

| | | | | |
|---|---|---|---|---|
| 4,745,992 A | * | 5/1988 | Lusa ........................... | 188/1.11 |
| 5,284,228 A | * | 2/1994 | Weiler et al. ............... | 188/71.8 |
| 5,388,670 A | * | 2/1995 | Kuskye et al. ............ | 188/73.38 |
| 5,687,817 A | * | 11/1997 | Kobayashi et al. ......... | 188/72.3 |
| 5,934,417 A | * | 8/1999 | Kobayashi et al. ......... | 188/72.3 |
| 5,947,233 A | * | 9/1999 | Kobayashi et al. ......... | 188/72.3 |

* cited by examiner

Primary Examiner—Christopher P. Schwartz
(74) Attorney, Agent, or Firm—Leo H. McCormick Jr.; Warren Comstock

(57) ABSTRACT

A spring clip located in a rail of an anchor of a disc brake to hold a carrier for a friction pad and provide a surface on which a projection on the carrier slides during movement of a the carrier toward a rotor by an input force to effect a brake application. The spring clip is characterized by a base having a surface thereon that substantially matches and covers the rail. A tab that extends from the base engages the anchor to fix the position of the base in the rail with respect to the rotor. An arm that extends inward from the base in plane perpendicular to the base has a lip on the end thereof that extends in a plane parallel with the rail. The projection on the carrier engages the arm whenever wear reduces a thickness of the friction pad to a predetermined thickness such that the projection thereafter engages the arm to bring the lip into engagement with the rotor whenever the first friction pad engages the rotor during a brake application. The lip on engagement with the rotor causes the arm to vibrate and thereby create an audible sound designed to alert an operator that optimum braking might thereafter be impaired with continued use of the friction pad.

9 Claims, 3 Drawing Sheets

DISC BRAKE

This invention relates to a spring clip for holding a carrier of a friction pad in a disc brake for a vehicle. The spring clip has a base with an arm extending therefrom that is brought into engagement with a rotor after the friction pad has been worn to a predetermined thickness to create a noise and alert an operator that continued use of the friction pad may impair optimum braking.

BACKGROUND OF THE INVENTION

In disc brakes, it is common to provide wear warning structure to indicate that a friction pad has worn to a thickness wherein continued use may impair the optimum braking capability of a brake system. The wear warning structure is most often a defined by a cantilever spring that is associated with the backing plate of the friction pad such as disclosed in U.S. Pat. No. 4,745,992 and 5,687,817 or in combination with an anti-rattle spring as disclosed in U.S. Pat. No. 5,388,670. While such wear warning structure functions in an adequate manner, it does involve additional processing as the cantilever spring is fixed to the backing plate during the manufacture of the friction pad.

SUMMARY OF THE INVENTION

In the manufacture of a pad spring, it was observed that a substantial quantity of scrap material is produced during a stamping process. During the stamping process, material is progressively removed from a substantially rectangular sheet until a final shape is produced that is designed to hold a friction pad from rattling. The final shape, defined by first and second legs that are joined together by a spacer, is designed to cover the rail to provide a smooth and oxidation free surface on which an ear on a backing plate slides during a brake application. The amount of material designated as scrap in the manufacture is essentially equal to a dimension between the first and second legs less the spacer width which is at least equal to the width of a rotor and a running tolerance between the rotor and the surface of the friction pads. In accordance with the present invention, a portion of the material previously considered as scrap and in particular the material originally located between a base for the first and second legs is retained during the stamping process and shaped to define first and second cantilever arms. The first and second cantilever arms form wear indicators by being engaged, after a predetermined wear of the friction pads, by ears that extend from backing plates for the first and second friction pads. Thereafter, the cantilever arms are moved into engagement with the rotor to create a noise or sound and thereby inform an operator of a wear thickness of a friction pad that could impair braking through the continued use of the friction pads in a disc brake.

A primary object of the present invention is to provide a disc bake with a wear indicator which is an integral component of a spring clip, the spring clip being secured to an anchor to provide a sliding surface on which a backing plate of a friction [slides] during a brake application.

According to this invention, the spring clip holds an ear that extends from backing plate for a friction pad in an alignment rail of an anchor for a disc brake. The spring clip provides a sliding surface for a projection or ear during a brake application. During a brake application, an actuation force is applied to the backing plate to move the friction pad toward and into engagement with a rotor. The spring clip is characterized by first and second legs that are separated by a spacer. The first and second legs have a surface that substantially matches and covers the rail of the anchor of the disc brake. Each leg has at least one tab that extends from the base and engages the anchor to fix the position of the base and correspondingly the first and second legs with respect to the anchor and a cantilever arm. The cantilever arm extends inwardly in plane substantially perpendicular to the base of at least one of the legs and has a lip located that is located in a plane substantially parallel with the rail. The cantilever arm is located on the spring clip such that after the friction pad has worn to a predetermined thickness, the projection or ear on the backing plate engages the cantilever arm. Thereafter, whenever an actuation force that is applied to the backing plate moves the friction pad into engagement with the rotor during a brake application, the lip is also brought into engagement with the rotor. The lip on engagement with the rotor causes the cantilever arm to vibrate and create an audible sound to alert an operator that optimum braking may thereafter be impaired through the continued use of this friction pad in the disc brake. According to the invention, a plurality of cantilever arms may also be provided on a spring clip to provide an indication of tapered wear that can occur in a disc brake.

An advantage of this invention resides in the use of a spring clip that provides a sliding surface for movement of a backing plate for a friction pad with a cantilever arm that is sequentially moved by an ear on the backing plate, after a predetermined amount of wear has reduced the thickness of the friction pad, into engagement with a rotor to create a sound that is used to inform an operator of a wear condition of the friction pad.

DETAILED DESCRIPTION

Figure 1:
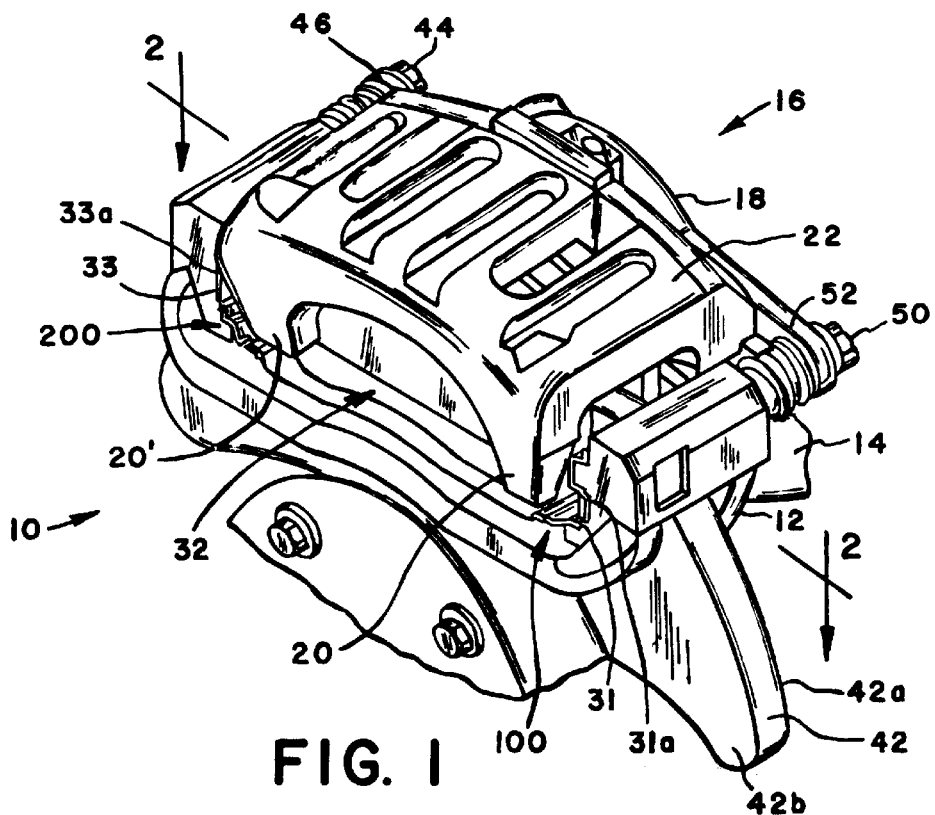
FIG. 1 is schematic illustration of a disc brake having a spring clip made according to the principals of the present invention.
Figure 2:
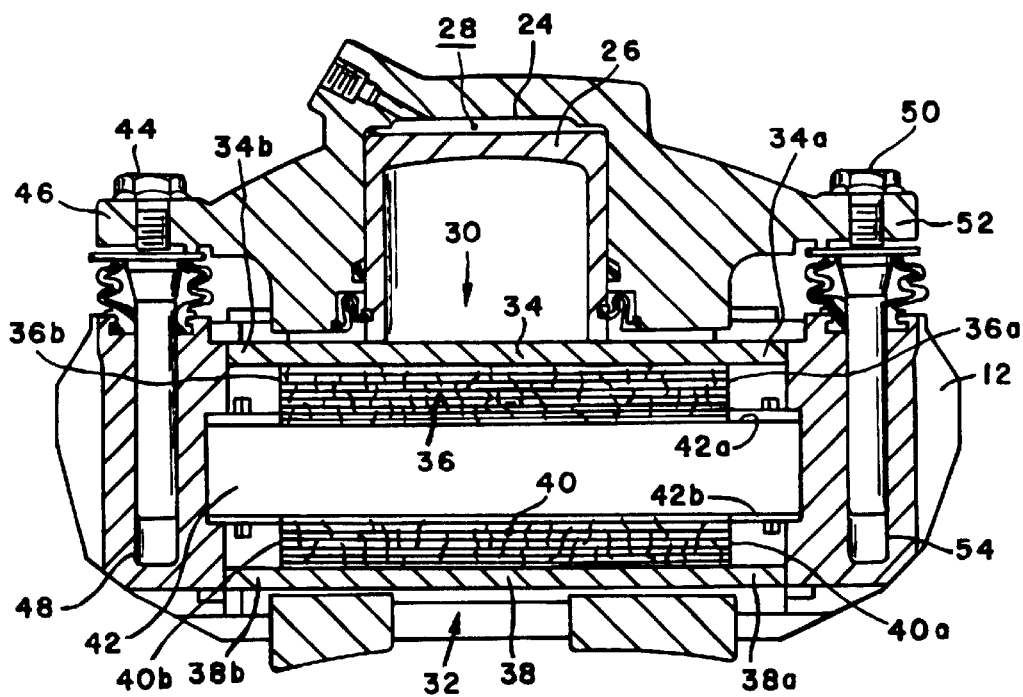
FIG. 2 is a sectional view of the disc brake of FIG. 1 taken along lines 2—2.

The disc brake 10 shown in FIGS. 1 and 2 for use in a brake system of a vehicle is basically of a type known in the prior art as disclosed in U.S. Pat. No. 5,810,122.

The disc brake 10 includes an anchor or support member 12 that is fixed to a frame member 14 of a vehicle in a manner as disclosed in U.S. Pat. No. 5,988,761 and an integral caliper 16 which is connected to the support member 12 in a manner defined by guide pins 44 and 50. The integral caliper 16 of disc brake 10 includes an actuation section 18 that is connected by a bridge 22 to unshaped arms 20,20'. The actuation section 18 has a bore 24 therein for the retention of a piston 26 to define an actuation chamber 28. A first friction member 30 is connected to piston 26 while a second friction member 32 is connected to arms 20,20. The first friction member 30 includes a backing plate 34 and a friction pad 36. The backing plate 34 has a first projection 34a that is held by a first leg 102 of a spring clip 100 located in a slot 31 and a second projection 34b that is held by a first leg 102 of a spring clip 200 located in slot 33 in the support member 12. The second friction member 32 includes a backing plate 38 and a friction pad 40. The backing plate 38 has a first projection 38a that is located in a second leg 104 of spring clip 100 which in turn is located in slot 31 and a second projection 38b located in a second leg 104 of spring clip 200 which is turn is located in slot 33 in the support member 12. Slots 31 and 33 define first and second rails in anchor 12 that are parallel to each other. The anchor or support member 12 is fixed to the vehicle to create a perpendicular relationship with rotor 42 such that the first 36 and second 40 friction pads are respectively positioned in parallel planes adjacent a first face 42a and a second face 42b of a rotor 42 that rotates with an axle of the vehicle. A first guide pin 44 is connected to an ear 46 that extends from the actuation section 18 and is mounted to slide in a first bore 48 in the support member 12. A second guide pin 50 is connected to ear 52 that extends from the actuation section 18 and is mounted to slide in a second bore 54 in the support member 12. The first 48 and second 54 bores in anchor or support member 12 are spaced apart and are also parallel to each other to respectively hold the first guide pin 44 and the second guide pin 50 in a parallel relationship with the first 33 and second 31 guide rails and assist in defining the perpendicular relationship between the rotor face 42a and the first friction member 36 and rotor face 42b and the second friction member 40. During a brake application, the caliper 16 slides with respect to the support member 12 and the guide pins 44 and 50 correspondingly move in bores 48 and 54 to maintain the parallel relationship between the friction pads 36 and 40 and corresponding surfaces 42a and 42b on rotor 42. When caliper 16 slides with respect to anchor 12, ear 34a on backing plate 34 and ear 38a on backing plate 38 slide in spring clip 100 and ear 34b on backing plate 34 and ear 38b on backing plate 38 sidle in spring clip 200 as the first friction member 30 and second friction member 32 are moved into engagement with rotor 42 to effect a brake application.

In disc brake 10, during a brake application, a leading edge (36a and 40a or 36b and 40b) for the friction pads 36 and 40 is defined by the rotation of rotor 42 and is first surface to engage the rotor 42. When 36a and 40a are the leading edge of the friction pads 36 and 40, projection 34b on backing plate 34 and projection 40b on backing plate 38 engage the bottom 31a of slot 31 and when edges 36b and 40b are the leading edge, projection 34a on backing plate 34 and projection 38a on backing plate 38 engage the bottom 33a of slot 33 to transmit torque forces developed during a brake application into the anchor or support member 12. The actuating and reaction forces are applied to move the friction members 36 and 40 toward the rotor 42, however once a leading edge engages the rotor 42 the projection on the backing plate 34 adjacent the leading edge moves away from the bottom of the rail as the torque forces is transmitted into the anchor 12 through the projection adjacent the trailing edge and as a result some movement may occur at the leading edge as the leading edge is not now fully engaged with the bottom of the rail. Thus, even though the first 44 and second 50 guide pins engage the bores 48 and 54 to assist in maintaining a perpendicular relationship between the surfaces on the friction pads 36 and 40 with the rotor 42 some twisting may occur and as a consequence more wear can occur in the corresponding trailing edge on one friction pad and then on a leading edge on the other friction pad. While this condition may not impact an individual brake application, over a period of time the wear can become excessive and in an extreme situation wear of one edge may reach the backing plate while on the other edge considerable friction material remains. In order to inform an operator of a condition wherein the friction pads 36 and 40 may have worn in an uneven manner that may impact future braking of a vehicle, lining wear sensors have been associated with the first 30 and second 32 friction members.

In the present invention, the friction lining wear sensors are an integral part of the first 100 and second 200 spring slippers that are provided between the anchor 12 and first 34 and second 38 backing plates to provide a non-corrosive surface on which projections 34a and 34b and 38a and 38b slide during a brake application.

The structure and functional operation of the first 100 and second 200 spring slippers are identical and the detailed description and numbers hereinafter used in describing the first spring slipper 100 are also used where necessary to explain the second spring slipper 200.

Figure 7:
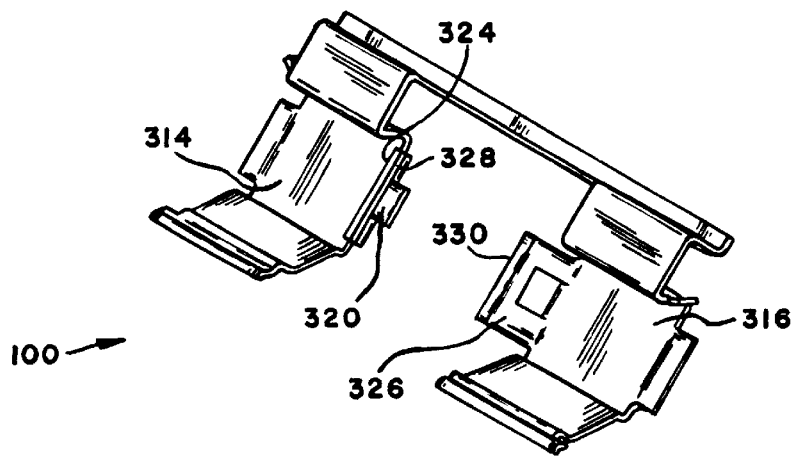
FIG. 7 is a perspective illustration of the spring clip of FIG. 6.

The manufacture of the spring slipper 100 is defined by a stamping operating wherein a substantially flat rectangular sheet of metal material 300 is taken from a supply. The sheet of metal material 300 is moved through a series of dies where material is removed to define a first leg 302 and a second leg 304 that are separated by a spacers 306, 308 and 310. Thereafter, spacer 308, that is located between the first leg 302 and the second leg 304, is severed at its mid-point 312 into projections 318a and 318b and the first leg 302 and second leg 304 are shaped into the profile of the rail (31 or 33) of the anchor 12. Thus, the material that was previously discarded as scrap, defined by projections 318a and 318b respectively remains attached to the legs 302 and 304 and is further shaped according to the present invention. During the initial stamping legs 302 and 304 each have a profile that is defined by the rail in anchor 16 such that the first leg 302 has a base 314 and the second leg 304 has a base 316 with a shape that matches the bottom surface 31a of rail 31 in anchor 16. During this initial stamping, a first tab 320 is stamped in projection 318a and a second tab 322 is stamped in projection 318a such that the tabs 320 and 322 extending outward from bases 314 and 316 and the remaining portion of projections 31 8a and 31 8b are thereafter stamped or bent to extend inward in a plane perpendicular to the bases 314 and 316 to respectively define cantilever arms 324 and 326. A first lip 328 is stamped on the end of arm 324 and a second lip 330 is stamped on the end of arm 326 such that the lips 328 and 330 extend in a plane that is parallel with bases 314 and 316 to complete the manufacture of a spring slipper 100 as illustrated in FIG. 7. The length of the first 328 lip and the second 330 lip is defined as a thickness that equals a minimum thickness of operational friction material for a pad where an alert is initially provided to an operator indicating that the thickness of the lining or pad may need to be replace to assure optimum braking of a vehicle.

Figure 3:
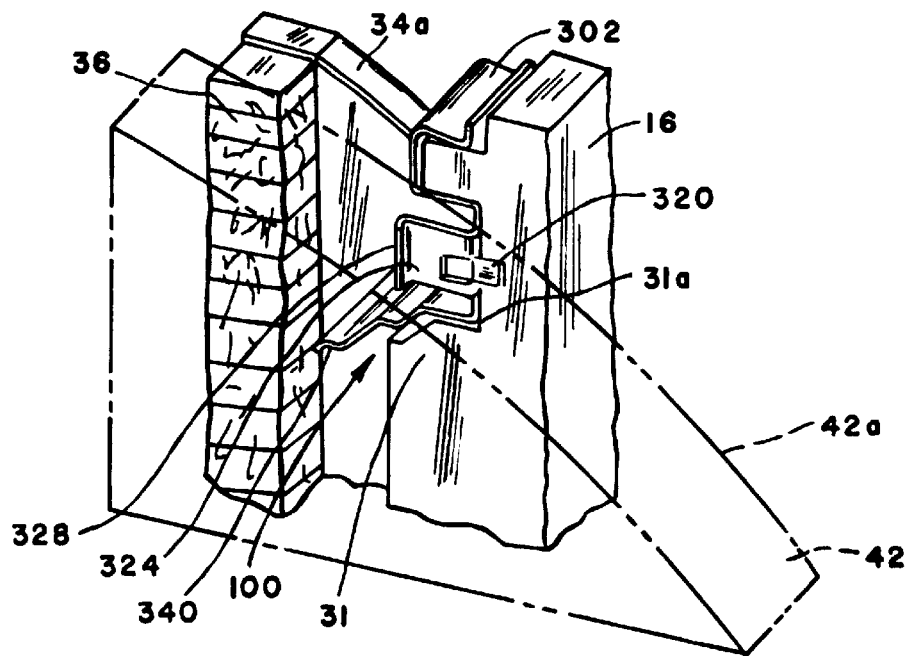
FIG. 3 is a perspective illustration of a portion of the friction pad, backing plate, spring clip, rotor, and rail on the anchor of the disc brake of FIG. 1.
Figure 4:
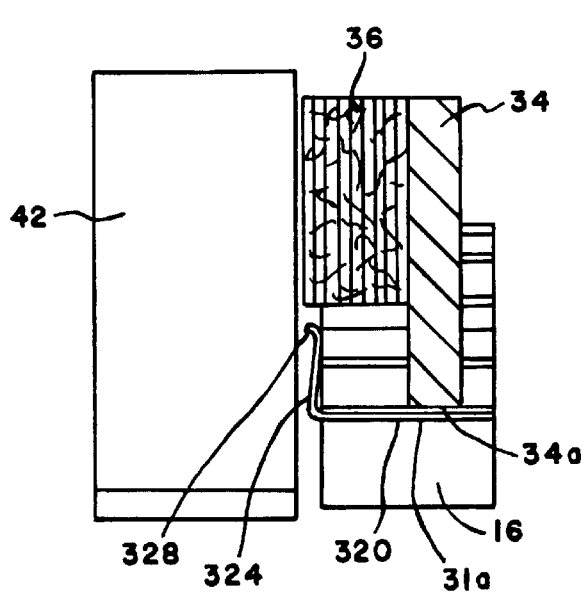
FIG. 4 is a schematic illustration of the perspective illustration of FIG. 3 when the friction pad has a first thickness.

The spring slipper 100 is designed such that tabs 320 and 322 engage anchor 16 to hold the slipper stationary within the anchor 16 and substantially cover the rail 31 of the anchor 16 with a corrosion resistant surface while providing a surface on which projections 34a and 38a slide during a brake application. Spring slipper 200 is designed to function in a similar manner with respect rail 33. This relationship which is illustrated in FIGS. 3 and 4 for projection 34a and leg 302 after friction pad 34 is inserted in rail 31 and for projection 34b after friction pad 34 is inserted in rail 33 and for projection 38a of pad 38 after insertion in rail 31 and for projection 38a of friction pad 38 after insertion in rail 33. Once the projection 34a is inserted into spring slipper 100 and projections 34b is inserted into spring slipper 200 and projection 38a is inserted in spring slipper 100 and projection 38b is inserted in spring slipper 200 the friction pads 36 and 40 are resiliently held by springs 340 (only one being shown) that engage anchor 16.

Mode of Operation

Figure 5:
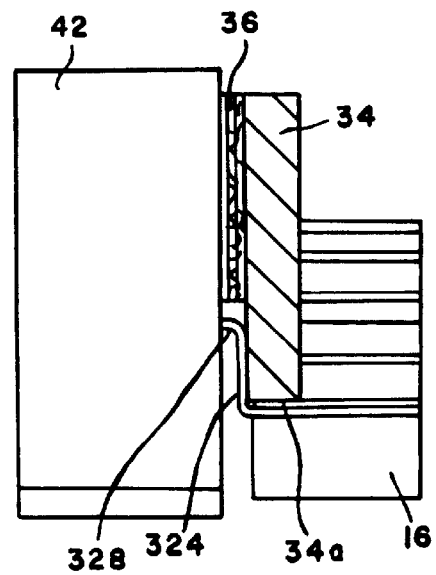
FIG. 5 is a schematic illustration of the perspective illustration of FIG. 3 when the friction pad has been worn to a second thickness.
Figure 6:
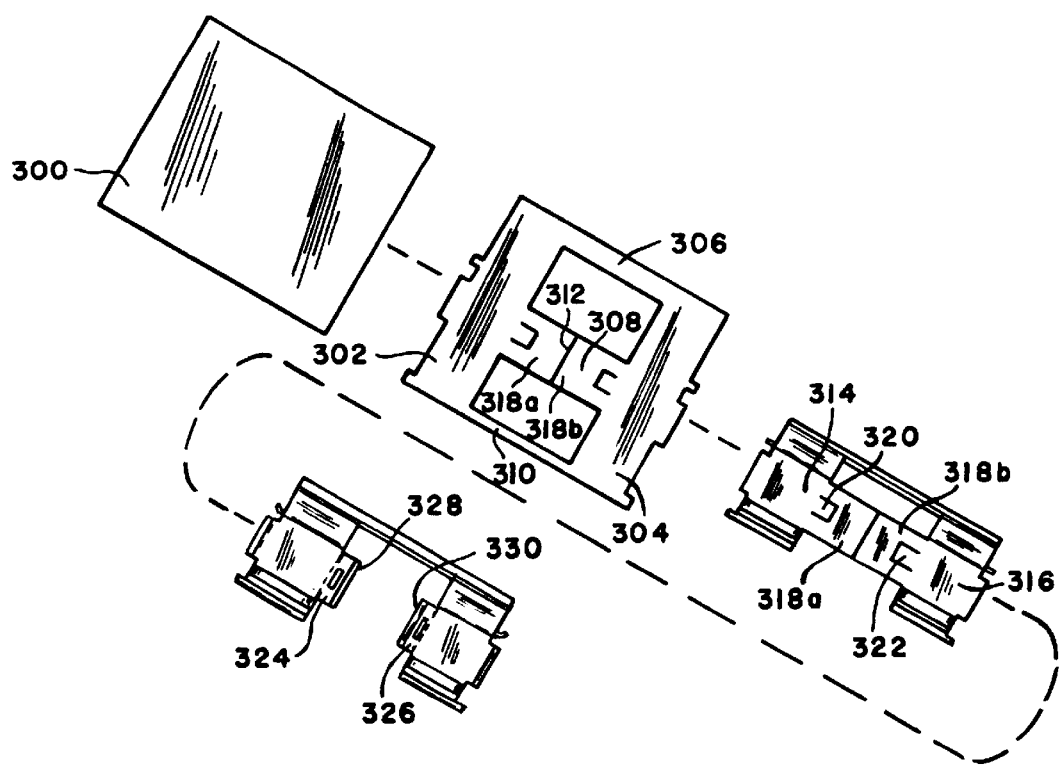
FIG. 6 illustrates a stamping processing for a spring clip of the type used in the disc brake of FIG. 1.

When an operator desires to effect a brake application, pressurized fluid is supplied to the actuation chamber 28 of bore 24. The pressurized fluid acts on piston 26 and actuation section 18 by way of the bottom 24a of bore 24, to develop an actuation force and a reaction force. The actuation force acts on the first friction member 30 to move face on friction pad 36 toward rotor face 42a with the projection 34a on backing plate 34 sliding in spring slipper 100 and projection 34b on backing plate 34 sliding in spring slipper 200 while reaction force acts through arm 20 with the projection 38a on backing plate 38 sliding in spring slipper 100 and projection 38b on backing plate 38 sliding in spring slipper 200 to move friction pad 40 toward face 42b on rotor 42. The disc brake 10 continues to operate in a manner as described above during a brake application as long as the thickness of a friction pad 36 or 40 remains above a predetermined thickness to provide an optimum braking. Unfortunately over a period of time engagement of the friction pads 36 and 40 with rotor 42, wear occurs and as a result the thickness of the friction pads are reduced from an original thickness to a second thickness. This second thickness which is illustrated in FIG. 5 to be equal to the thickness of the lip 328 also applies to lips 328a, 330 and 330a. In a next brake application, when the actuation force acts on and moves backing plate 34 toward face 42a on rotor 42 and the reaction force acts on and moves backing plate 38 toward face 42b on rotor 42, projection 34a slides on spring slipper 100 to engage arm 324 and projection 34b slides in spring slipper 200 to engage arm 324a and similarly projection 38a slides in spring slipper 100 to engage arm 326 and projection 38 slides in spring slipper 200 to engage arm 326a. When friction pad 36 engages face 42a, lips 328 and 328a also engage face 42a and when friction pad 40 engages face 42a, lips 330 and 330a also engages face 42b. This engagement causes arms 324,324a, 330 and 330a to simultaneously vibrate and create a noise to inform an operator that continues braking through the use of friction pads 36 and 40 may result in less than optimum braking.

In actual situations, the friction pads 36 and 40 do not wear in a uniform manner and as a result the thickness of a friction pad will be different at a predominate leading edge than at a trailing edge. In the present invention, wear indicators as defined by the cantilever arms that extend from the spring slippers would be individually activated to create a noise that would inform an operator of a situation wherein continued use of the brake system may impact optimum braking of the vehicle. Thus, an operator would be informed by a single sound or combination of sound sounds generated by the vibration of several cantilever arms of an eminent condition in the disc brake 10.

I claim:

1. A disc brake having an anchor fixed to a housing, said anchor having first and second rails that respectively receive first and second projections that extend from first and second carrier members to align a first friction pad attached to said first carrier member and a second friction pad attached with said second carrier member with a rotor, first spring clip means located in said first rail and second spring clip means located in said second rail, said first and second spring clip means engaging and urging said first and second carrier members into engagement with said anchor to attenuate vibratory movement of said first and second friction pads, said first and second carrier members responding to actuation forces by respectively axially sliding on said first and second spring clip means to bring said first and second friction pads into engagement with the rotor and produce a braking force to effect a brake application, said first and second friction pads having an initial first thickness that is reduced in size over a period of time by wear engagement with said rotor to a second thickness, said first spring clip means being characterized by a first base; at least a first tab that extends from said first base and engages said anchor to fix said first base on said anchor whereby said first base substantially covers said first rail; and a first arm that extends inward in plane perpendicular to said base, said first arm having a first lip on the end thereof that extends in a plane parallel with said first rail, said first projection on said first carrier engaging said first arm whenever said first friction pad reaches said second thickness to bring said first lip into engagement with said rotor and when said first friction pad engages said rotor during a brake application, said first lip on engagement with said rotor causing said first arm to vibrate and thereby creating a first audible sound to alert an operator that optimum braking may thereafter be impaired.

2. The disc brake as recited in claim 1 wherein said first spring clip means is further characterized by a second arm that extends inward in plane perpendicular to a second base, said second arm having a second lip on the end thereof that extends in a plane parallel with said first rail, said first projection on said second carrier engaging said second arm when said second friction pad reaches said second thickness to bring said second lip into engagement with said rotor whenever said second friction pad engages said rotor during a brake application, said second lip on engagement with said rotor causing said second arm to vibrate and thereby create a second audible sound to alert an operator that optimum braking may thereafter be impaired.

3. The disc brake as recited in claim 2 wherein said first carrier member is characterized as being located adjacent a piston retained in a caliper and said second carrier member is characterized by being located adjacent a leg on a bridge that spans the rotor and is connected to the caliper, said piston acts on said first carrier member to move the first friction pad into engagement with rotor while said leg acts on said second carrier member to move said second friction pad into engagement with the rotor to effect a brake application.

4. The disc brake as recited in claim 3 wherein said first rail is characterized as retaining said first projections on said first and second carrier members and wherein said first projections are defined as being associated with the trailing edge of said first and second friction pads when a vehicle is traveling in a forward direction.

5. The disc brake as recited in claim 1 wherein said second spring clip means being characterized by a second base; at least a first tab that extends from said second base and engages said anchor to fix said second base to said anchor whereby said second base substantially covers said second rail; and a first arm that extends inward in plane perpendicular to said second base, said first arm having a first lip on the end thereof that extends in a plane parallel with said second rail, said second projection on said first carrier engaging said first arm on said second base when said first friction pad reaches said second thickness to bring said first lip on said first arm of said second base into engagement with said rotor when said first friction pad engages said rotor during a brake application, said first lip on engagement with said rotor causing said first arm extending from said second base to vibrate and thereby create a second audible sound to alert an operator that optimum braking may thereafter be impaired.

6. The disc brake as recited in claim 5 wherein said second spring clip means is further characterized by a second arm that extends inward in plane perpendicular to said second base, said second arm having a second lip on the end thereof that extends in a plane parallel with said second rail, said second projection on said second carrier engaging said second arm on said second clip means when said second friction pad reaches said second thickness to bring said second lip into engagement with said rotor whenever said second friction pad engages said rotor during a brake application, said first second lip on engagement with said rotor causing said second arm to vibrate and thereby create a third audible sound to alert an operator that optimum braking may thereafter be impaired.

7. The disc brake as recited in claim 2 wherein said wherein said second spring clip means is characterized by a second base; at least a first tab that extends from said second base and engages said anchor to fix said second base to said anchor whereby said second base substantially covers said second rail; and a first arm that extends inward in plane perpendicular to said second base, said first arm having a first lip on the end thereof that extends in a plane parallel with said second rail, said second projection on said first carrier engaging said first arm on said second base when said first friction pad reaches said second thickness to bring said first lip on said first arm of said second base into engagement with said rotor when said first friction pad engages said rotor during a brake application, said first lip on engagement with said rotor causing said first arm extending from said second base to vibrate and thereby create a third audible sound to alert an operator that optimum braking may thereafter be impaired.

8. The disc brake as recited in claim 7 wherein said second spring clip means is further characterized by a second arm that extends inward in plane perpendicular to said second base, said second arm having a second lip on the end thereof that extends in a plane parallel with said second rail, said second projection on said second carrier engaging said second arm on said second clip means when said second friction pad reaches said second thickness to bring said second lip into engagement with said rotor whenever said second friction pad engages said rotor during a brake application, said first second lip on engagement with said rotor causing said second arm to vibrate and thereby create a fourth audible sound to alert an operator that optimum braking may thereafter be impaired.

9. A spring clip for use in a disc brake to hold a carrier for a friction pad located in an alignment rail of an anchor, said spring clip providing a surface for a projection on the carrier to slide during movement of the carrier toward a rotor by an input force during a brake application, said spring clip being characterized by a base having a surface that substantially matches and covers said rail, a tab that extends from the base and engages the anchor to fix the position of the base with respect to the rotor, and an arm that extends inward in plane substantially perpendicular to said base, said arm having a lip on the end thereof that extends in a plane substantially parallel with said rail, said projection on said carrier engaging said arm whenever a thickness of said friction pad reaches a predetermined thickness to bring said lip into engagement with said rotor and when said friction pad engages said rotor during a brake application, said lip on engagement with said rotor causing said arm to vibrate and thereby create an audible sound to alert an operator that optimum braking may thereafter be impaired.

* * * * *